US008295280B2

(12) United States Patent
Gopalakrishna et al.

(10) Patent No.: US 8,295,280 B2
(45) Date of Patent: Oct. 23, 2012

(54) MULTI-SERVICE ADAPTABLE ROUTING PROTOCOL FOR WIRELESS SENSOR NETWORKS

(75) Inventors: Aravind Kota Gopalakrishna, Bangalore (IN); Manohara M. M. Pai, Parkala (IN)

(73) Assignee: Manipal Institute of Technology, Manipal (IN)

( * ) Notice: Subject to any disclaimer, the term of this patent is extended or adjusted under 35 U.S.C. 154(b) by 248 days.

(21) Appl. No.: 12/726,945

(22) Filed: Mar. 18, 2010

(65) Prior Publication Data
US 2011/0149844 A1 Jun. 23, 2011

(30) Foreign Application Priority Data
Dec. 21, 2009 (IN) ............................. 3151/CHE/2009

(51) Int. Cl.
*H04L 12/28* (2006.01)
(52) U.S. Cl. ...................... 370/389; 370/238; 370/310.1; 370/328; 370/349; 709/224; 709/225; 709/230
(58) Field of Classification Search .................. 370/238, 370/310.1, 318, 328, 332, 338, 349, 389; 709/224, 225, 230
See application file for complete search history.

(56) References Cited

U.S. PATENT DOCUMENTS

| 5,987,011 | A * | 11/1999 | Toh ............................. 370/331 |
| 6,046,978 | A | 4/2000 | Melnik |
| 6,522,628 | B1 * | 2/2003 | Patel et al. ................. 370/230.1 |
| 6,535,498 | B1 | 3/2003 | Larsson et al. |
| 6,735,448 | B1 * | 5/2004 | Krishnamurthy et al. ..... 455/522 |
| 6,735,630 | B1 * | 5/2004 | Gelvin et al. ................. 709/224 |
| 6,873,839 | B2 * | 3/2005 | Stanforth ................... 455/343.2 |
| 6,934,752 | B1 * | 8/2005 | Gubbi ........................... 709/225 |
| 6,954,435 | B2 * | 10/2005 | Billhartz et al. .............. 370/252 |
| 7,006,472 | B1 * | 2/2006 | Immonen et al. ............. 370/332 |
| 7,035,240 | B1 * | 4/2006 | Balakrishnan et al. ....... 370/338 |
| 7,151,769 | B2 * | 12/2006 | Stanforth et al. ............. 370/351 |
| 7,161,926 | B2 * | 1/2007 | Elson et al. ................... 370/338 |
| 7,277,414 | B2 * | 10/2007 | Younis et al. ................. 370/338 |
| 7,327,683 | B2 * | 2/2008 | Ogier et al. ................... 370/236 |
| 7,436,789 | B2 * | 10/2008 | Caliskan et al. ........... 370/310.1 |
| 7,680,073 | B2 | 3/2010 | Jamieson et al. |
| 7,729,260 | B2 | 6/2010 | Larsson et al. |
| 7,907,616 | B1 * | 3/2011 | Breau et al. ............. 370/395.21 |
| 8,050,259 | B2 * | 11/2011 | Bosch et al. ................. 370/389 |
| 8,111,652 | B2 * | 2/2012 | Kitazawa et al. ............. 370/329 |
| 2003/0133459 | A1 * | 7/2003 | Siddiqui et al. .......... 370/395.21 |
| 2003/0202465 | A1 | 10/2003 | Cain |
| 2004/0153520 | A1 | 8/2004 | Rune et al. |
| 2004/0167988 | A1 | 8/2004 | Rune et al. |

(Continued)

OTHER PUBLICATIONS

F. Akyildiz, W. Su, Y. Sankarasubramaniam, and E. Cayirci, "A survey on sensor networks," IEEE Communications Magazine, vol. 40, No. 8, pp. 102 114, Aug. 2002.

(Continued)

*Primary Examiner* — Ayaz Sheikh
*Assistant Examiner* — Andrew C Lee
(74) *Attorney, Agent, or Firm* — Maschoff Gilmore & Israelsen

(57) ABSTRACT

In accordance with various aspects of the present disclosure, an apparatus is disclosed that includes a sensor node configured to operate in a wireless sensor network, wherein the sensor node is configured to receive a data packet that comprises a quality of service field, examine the quality of service field, and invoke one of a plurality of pre-stored algorithms depending on the value of the quality of service field.

20 Claims, 17 Drawing Sheets

U.S. PATENT DOCUMENTS

| | | | |
|---|---|---|---|
| 2005/0053005 A1* | 3/2005 | Cain et al. | 370/235 |
| 2005/0054346 A1* | 3/2005 | Windham et al. | 455/445 |
| 2005/0188103 A1 | 8/2005 | Chen | |
| 2006/0193295 A1* | 8/2006 | White et al. | 370/336 |
| 2007/0245033 A1* | 10/2007 | Gavrilescu et al. | 709/230 |
| 2010/0232447 A1* | 9/2010 | Jing et al. | 370/412 |
| 2010/0254312 A1* | 10/2010 | Kennedy | 370/328 |
| 2010/0309844 A1* | 12/2010 | Wang et al. | 370/328 |

OTHER PUBLICATIONS

J.N. Al-Karaki and A.E. Kamal, "Routing techniques in wireless sensor networks: a survey," IEEE Wireless Communication Magazine, vol. 11, No. 6, pp. 6-28, Dec. 2004.

K. Sohrabi, J. Gao, V. Ailawadhi, and G.J. Pottie, "Protocols for self-organization of a wireless sensor network," IEEE Personal Communication Magazine, vol. 7, No. 5, pp. 16-27, Oct. 2000.

C. Intanagonwiwat, R. Govindan, and D. Estrin, "Directed diffusion: a scalable and robust communication paradigm for sensor networks," Proc. of ACM MOBICOM 2000, pp. 56-67, Aug. 2000.

D. Braginsky and D. Estrin, "Rumor routing algorithms for sensor networks," Proc. of ACM Workshop on Wireless Sensor Networks and Applications, pp. 22-3 1, Sep. 2002.

Ivan Stojmenovic, Handbook of Sensor Networks: Algorithms and Architectures, Wiley—Interscience, 2005, Chapter 13, pp. 419-441.

Holger Karl and Andreas Willig, Protocols and Architectures for Wireless Sensor Networks, John Wiley & Sons, Ltd, 2005, Chapter 11, pp. 289-326.

Imad Mahgoub and Mohammed Ilyas, Sensor Network Protocols, Taylor and Francis Group, 2006, Chapters 9 & 10.

Kazem Sohraby, Daniel Minoli, Taieb Zinati, Wireless Sensor Networks—Technology, Protocols and Applications, Wiley—Interscience, 2007, Chapter 6, pp. 197-219.

Edgar H. Callaway, Wireless Sensor Networks—Architectures and Protocols, CRC Press, 2004, Chapter 5.

Luna-Vazquez, Implementation and Simulation of Routing Protocols for Wireless Sensor Networks, Master Thesis, University of Siegen, Israel, 2006.

Felemban, E., Lee, C.G., Ekici, E., Boder, R., Vural, S. "Probabilistic qos guarantee in reliability and timeliness domains in wireless sensor networks", INFOCOM 2005.

Q. Jiang and D. Manivannan. Routing Protocols for Sensor Networks. In Proc. IEEE (CCNC), 2004.

M. Chu, H. Haussecker, and F. Zhao, "Scalable information driven sensor querying and routing for ad hoc heterogeneous sensor networks," International Journal of High Performance Computing and Applications, vol. 16, No. 3, Aug. 2002.

R.C. Shah and J.M. Rabaey, "Energy aware routing for low energy ad hoc sensor networks," Proc. of Wireless Communications and Networking Conference (WCNC) 2002, pp. 350-355, Mar. 2002.

S. D. Servetto and G. Barrenetxea, "Constrained random walks on random graphs: routing algorithms for large scale wireless sensor networks," Proc. of 1st ACM International Workshop on Wireless Sensor Networks and Applications (WSNA), 2002, pp. 12-21.

W.R. Heinzelman, A. Chandrakasan; and H. Balakrishnan, "Energy-efficient communication protocol for wireless microsensor networks," Proc. of the 33rd Annual Hawaii International Conference on System Sciences, 2000, pp. 4-7, Jan. 2000.

S. Lindsey and C.S. Raghavendra, "PEGASIS: Power-efficient gathering in sensor information systems," Proc. of IEEE Aerospace Conference 2002, vol. 3, 9-16, pp. 1125-1130.

Manjeshwar and D.P. Agrawal, "APTEEN: a hybrid protocol for efficient routing and comprehensive information retrieval in wireless sensor networks," Proc. of International Parallel and Distributed Processing Symposium 2002, (Ipdps, 2002), pp. 195-202, Apr. 2002.

V. Rodoplu and T.H. Meng, "Minimum energy mobile wireless networks," IEEE Journal of Selected Areas in Communications, vol. 7, No. 8, pp. 1333-1344, Aug. 1999.

L. Li and J.Y. Halpern, "Minimum-energy mobile wireless networks revisited," Proc. of IEEE International Confernce on Communications, 2001, vol. 1, No. 11-14, pp. 278-283, Jun. 2001.

L. Subramanian and R.H. Katz, "An architecture for building self configurable systems," Proc. of 1st Annual Workshop on Mobile and Ad Hoc Networking and Computing, 2000, (MobiHOC 2000), pp. 63-73.

The Ns Manual and Documentation, obtained from url: <http://www.isi.edu/nsnam/ns/doc-stable/ns_doc.pdf>., obtained on Aug. 24, 2000.

\* cited by examiner

100

| Packet Type 102 | ToS with Phenom 110 | Hop-Count (L) 115 | ~ 120 |
|---|---|---|---|
| Average Waiting Time in the Queue 125 ||||
| Energy Level 130 ||||
| Source Address 135 || Forwarder Address 140 ||
| Upstream Neighbour-1 Address 145 || Upstream Neighbour-2 Address 150 ||
| Upstream Neighbour-3 Address 155 || ~ 160 ||

Figure 1. DATA_REQ Packet

200

| Packet Type 205 | ToS with Phenom 210 | Seq. Number 215 | ~ 220 |
|---|---|---|---|
| Energy Level 225 ||||
| Source Address 230 || Forwarder Address 235 ||
| Next-Hop Address 240 || Destination Address 245 ||
| Payload [70-Bytes] 250 ||||

Figure 2. DATA_REP Packet

300

| Neighbour ID (N) 305 | Energy Level (E) 310 | Average Waiting Time (T) 315 | Hop-Count to Sink (H) 320 | Forwarder 1 ID 325 | Forwarder 2 ID 330 | Forwarder 3 ID 335 |
|---|---|---|---|---|---|---|
| | | | | | | |

Figure 3. Forwarding Information Table

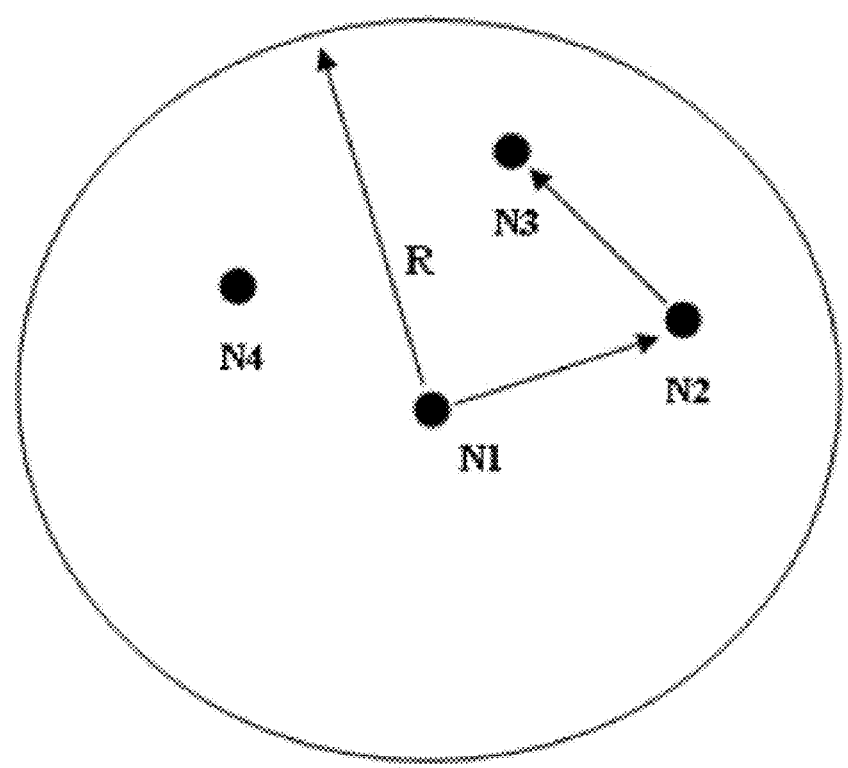
Figure 5 Illustration for the Role of Forwarding Nodes

700

| Node_ID ($C_i$) 705 | Source-Address ($C_{sa}$) 710 | Destn-Address ($C_{da}$) 715 |
|---|---|---|
|  |  |  |

Figure 7

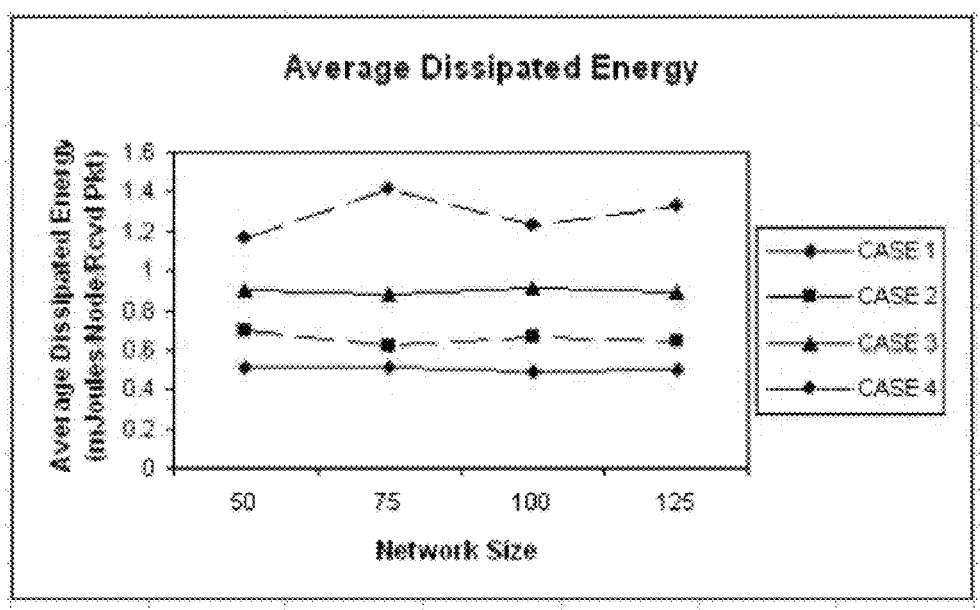
Figure 10 Average dissipated energy in a node with varying network sizes

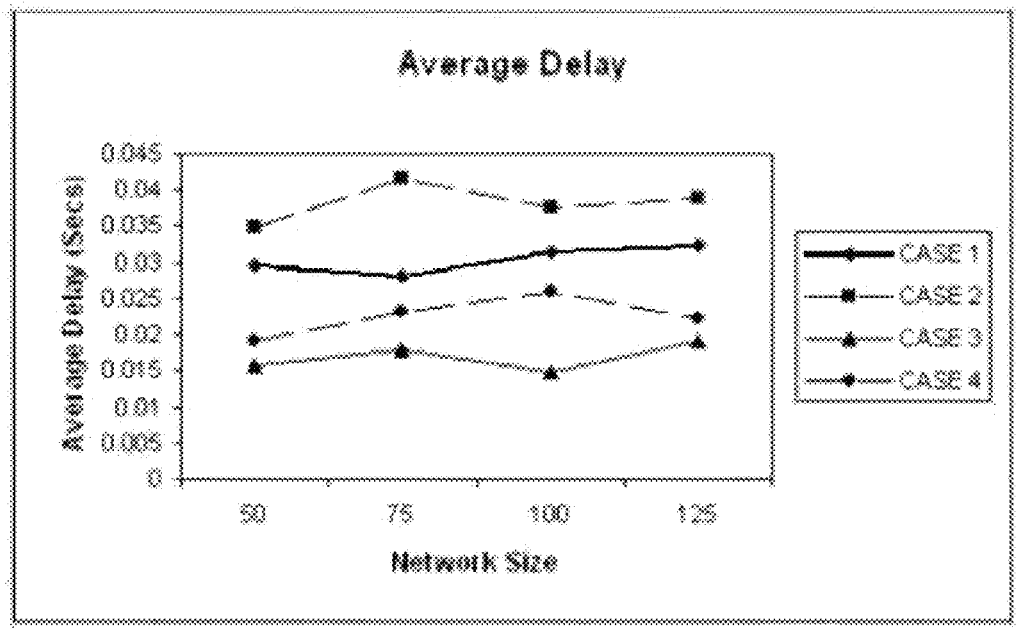
Figure 11 Average delay experienced by a message in different network sizes
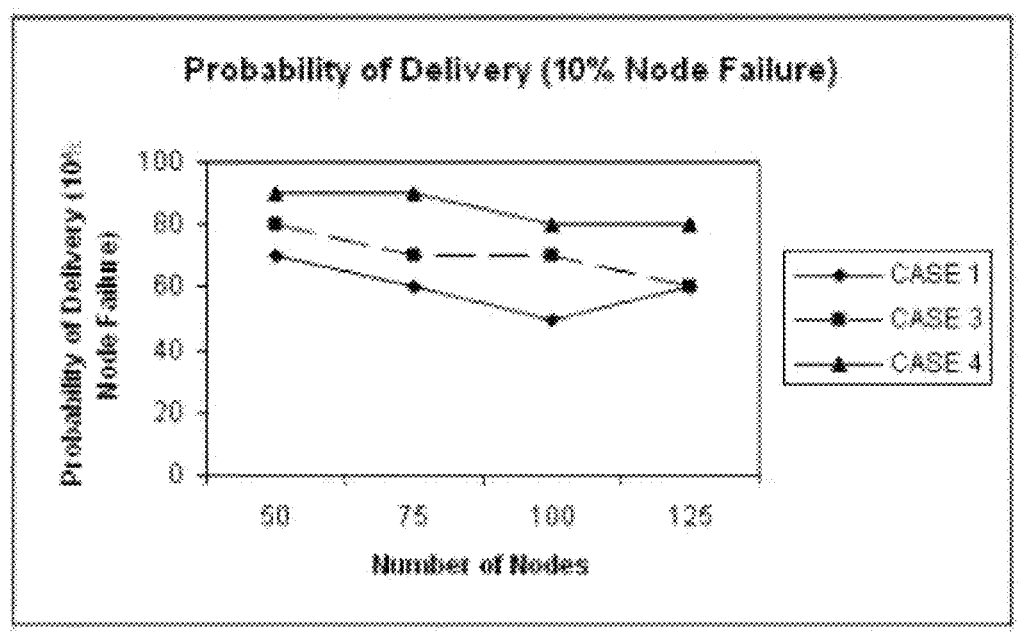
Figure 12 Probability of successful packet delivery with 10% of nodes failed

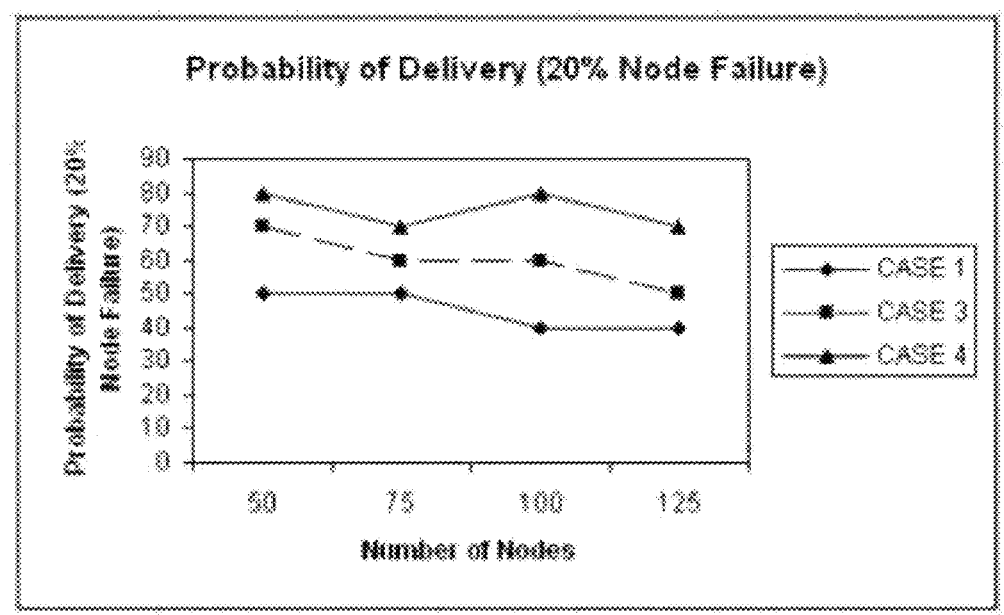
Figure 13 Probability of successful packet delivery with 20% of nodes failed

```
1: Start
2: Receive a Packet
3: If (Packet = REQ) then
4:       If (Node Hop-count >= Hop-count in the Packet) then
                  Node Hop-count = Hop-count in the Packet
                  Update the Forwarding Information Table
                  Forward the Packet
         Else
                  Drop the Packet
5: Else (Node = Forwarder) then
         Find the route according to the CASE
         Forward the Packet
6: End
```

EXEMPLARY PSEUDOCODE

FIG. 16

MULTI-SERVICE ADAPTABLE ROUTING PROTOCOL FOR WIRELESS SENSOR NETWORKS

BACKGROUND

This disclosure relates generally to the field of wireless sensor networks and, more specifically, to a multi-service adaptable routing protocol for wireless sensor networks.

Recent convergences of technological and application trends have resulted in an exceptional level of interest in wireless ad-hoc networks and in particular in Wireless Sensor Networks (WSNs). The push was provided by rapid progress in computation and communication technology as well as the emerging field of low cost, reliable, MEMS-based sensors. The pull was provided by numerous applications that can be summarized under the umbrella of computational worlds, where the physical world can be observed and influenced through the Internet and WSN infrastructures. Consequently, there have been a number of vigorous research and development efforts at all levels of development and usage of WSNs, including applications, operating systems, architectures, middleware, integrated circuits, and systems.

Typically, WSNs contain hundreds or thousands of sensor nodes that have the ability to communicate among themselves and also to an external base station (BS). While the sensor nodes have limited sensing region, processing power and energy, networking a large number of such nodes gives rise to a robust, reliable and accurate sensor network covering a wider region. Since the sensor nodes are energy-constrained, a typical deployment of a WSN poses many challenges and necessitates energy-awareness at all layers of the networking protocol stack.

For example, at the network layer, it is highly desirable to find methods for energy-efficient route discovery and relaying of data from the sensor nodes to the BS such that the lifetime of the network is maximized. Design of an efficient routing protocol is a particularly challenging task due to some of the characteristic features of such networks. Firstly, sensor nodes are tightly constrained in terms of energy, processing, and storage capacities and a routing protocol should minimize the resource consumption. Secondly, in contrast to other wireless networks, applications in WSNs require flow of sensed data from multiple sensor nodes (sources) to a particular BS (sink), therefore generating a new kind of traffic. Finally, data collected by many sensors in WSNs is typically based on common phenomena, so there is a high probability that this data has some redundancy. Such redundancy needs to be exploited by the routing protocols to improve energy and bandwidth utilization.

Example WSN routing protocols types includes multipath-based, query-based, negotiation-based, and quality-of-service (QoS)-based depending on the application of the protocol. Some industrial examples where the proposed algorithms may be used are outlined below.

SUMMARY

In accordance with various embodiments of this disclosure, an apparatus is disclosed that comprises a sensor node configured to operate in a wireless sensor network, wherein the sensor node is configured to receive a data packet that comprises a quality of service field, to examine the quality of service field, and to invoke one of a plurality of pre-stored algorithms depending on the value of the quality of service field.

In accordance with various embodiments of this disclosure, a system is disclosed that comprises a plurality of sensor nodes arranged in a wireless sensor network, wherein each sensor node is configured to receive and broadcast packets, wherein each of the plurality of sensor nodes can dispatch a data packet using one or more modes depending on a quality of service indicator that comprises the data packet.

In accordance with various embodiments of this disclosure, a method is disclosed that comprises transmitting a query packet to one or more sensor nodes within a wireless sensor network by a sink node, wherein the query packet is not constrained by a reliability requirement or latency requirement, and wherein the query packet includes a Type of Service Bit that is set to a value denoting a normal application; updating a table stored in the one or more sensor nodes with information of an adjacent sensor node within the wireless sensor network from which it has received the query packet; and using the table in conjunction with a routing algorithm to route a data packet.

In accordance with various embodiments of this disclosure, a method is disclosed that comprises selecting a primary path for routing a packet in a wireless sensor network for an application where reliability of packet delivery is important but where there is no stringent requirement on latency by selecting an upstream neighbor node with a least hop-count from a sink node; and selecting a first and a second alternate path at a source node by selecting the up-neighbors for the source node having a next least hop-counts after the primary path.

In accordance with various embodiments of this disclosure, a method is disclosed that comprises receiving a data packet with a Type of Service Bit set to a value denoting an application with a stringent latency bound at one or more sensor nodes within a wireless sensor network; communicating a buffer status or a queue length to all neighbors of node for each of one or more sensor nodes; and operating one or more sensor nodes with increased transmission power to increase a range so that a number of hops the data packet traversed within the wireless sensor network is reduced.

In accordance with various embodiments of this disclosure, a method is disclosed that comprises receiving at one or more sensor nodes within a wireless sensor network a data packet with a Type of Service Bit set to a value denoting an application that is both time critical and requires high reliability of packet delivery; selecting three neighbor nodes of the one or more sensor nodes such that their hop-counts are the three least hop-counts; and selecting from the three neighbor nodes a single neighbor node with a lowest waiting time.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

BRIEF DESCRIPTION OF THE DRAWINGS

FIG. 1 is a schematic representative of an illustrative embodiment of a DATA_REQ packet format sent by a sink throughout a network.

FIG. 2 shows the DATA_REP packet format sent by the source nodes.

FIG. 3 shows an example Forwarding Information Table.

FIG. 5 shows an illustration for the role of forwarding nodes.

FIG. 7 shows a Path Construction Table (PCT).

FIG. 10 shows a plot of average dissipated energy in a node with varying network sizes.

FIG. 11 shows a plot of average delay experienced by a message in different network sizes.

FIG. 12 shows a plot of probability of successful packet delivery with 10% of nodes failed.

FIG. 13 shows a plot of probability of successful packet delivery with 20% of nodes failed.

FIG. 16 shows an example portion of pseudocode.

DETAILED DESCRIPTION

Figure 4A:
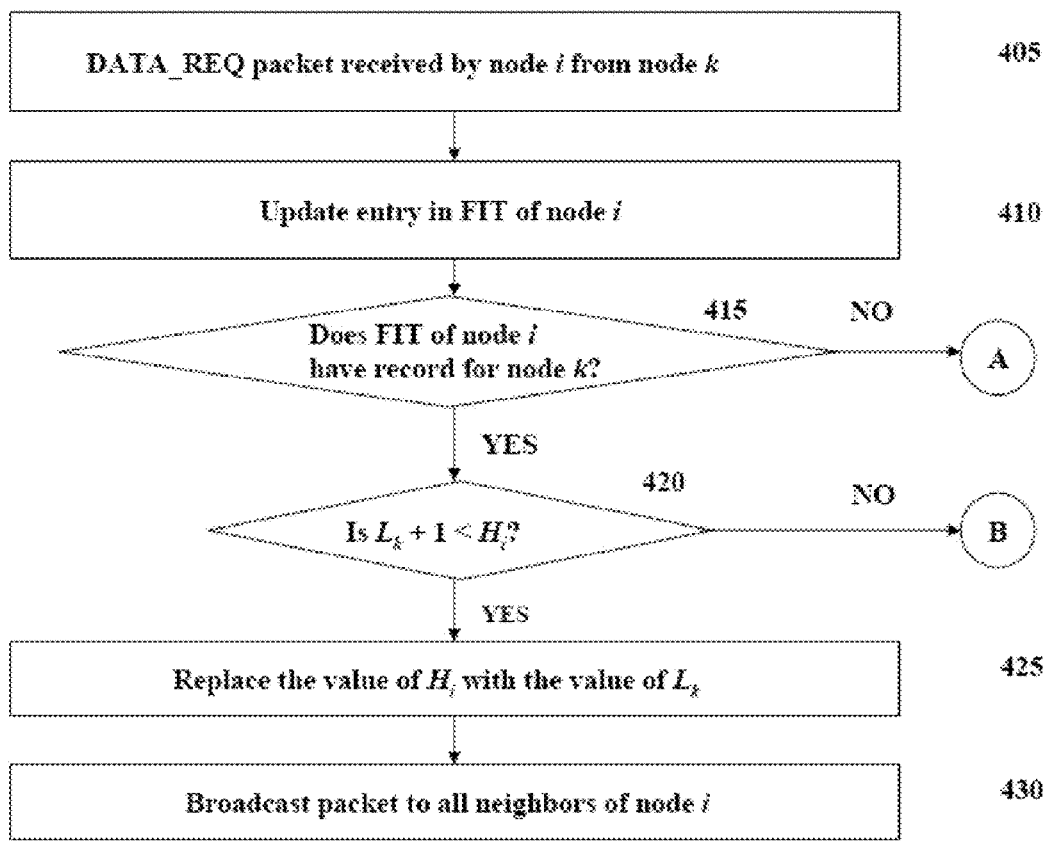
FIGS. 4a, 4b, 4c and 4d show an example flowchart for the example routing algorithm for the first class of QoS.
Figure 4B:
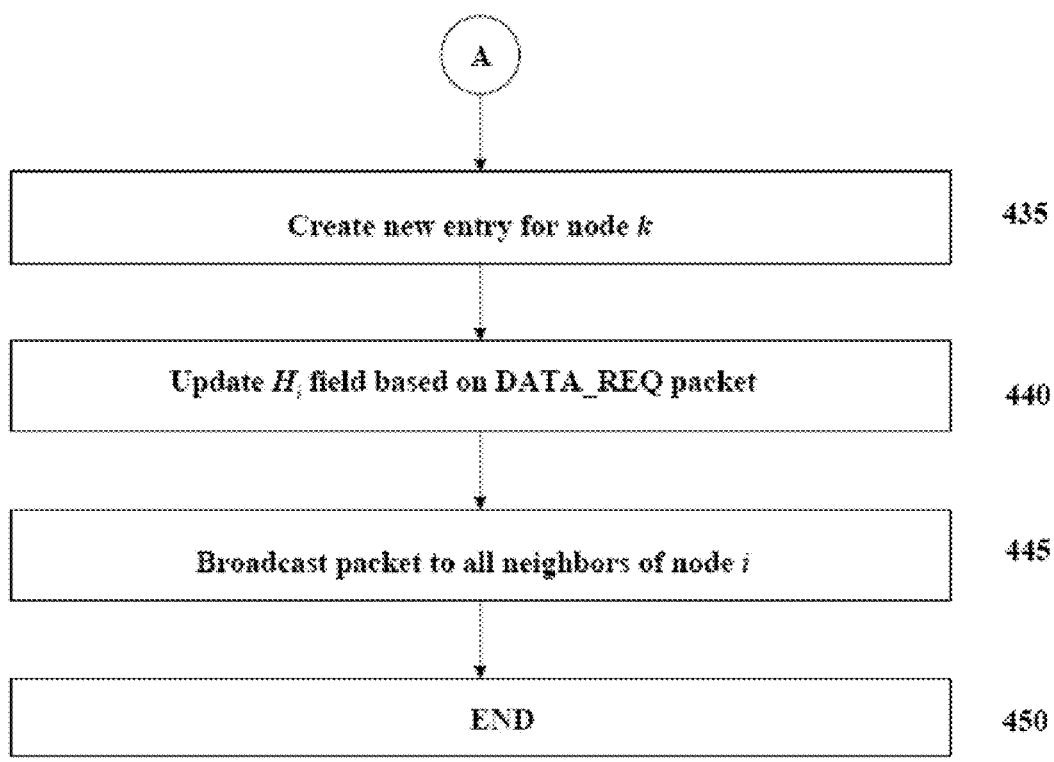
Figure 4C:
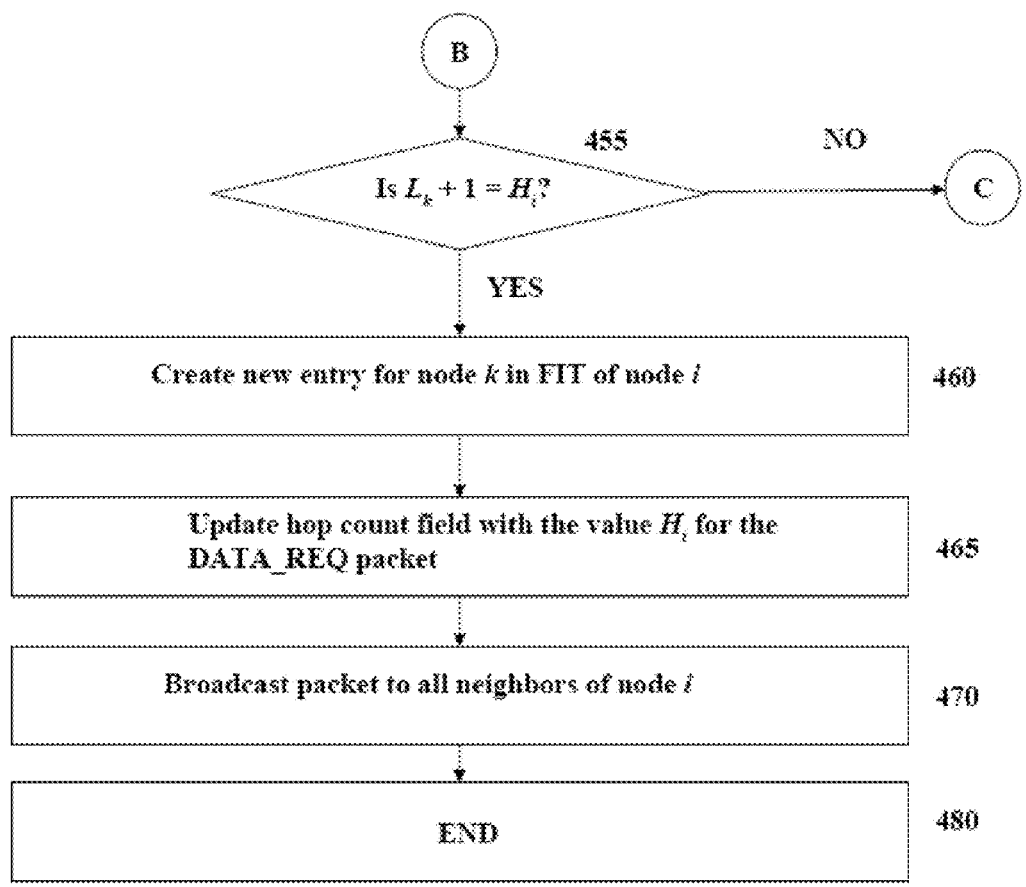
Figure 4D:
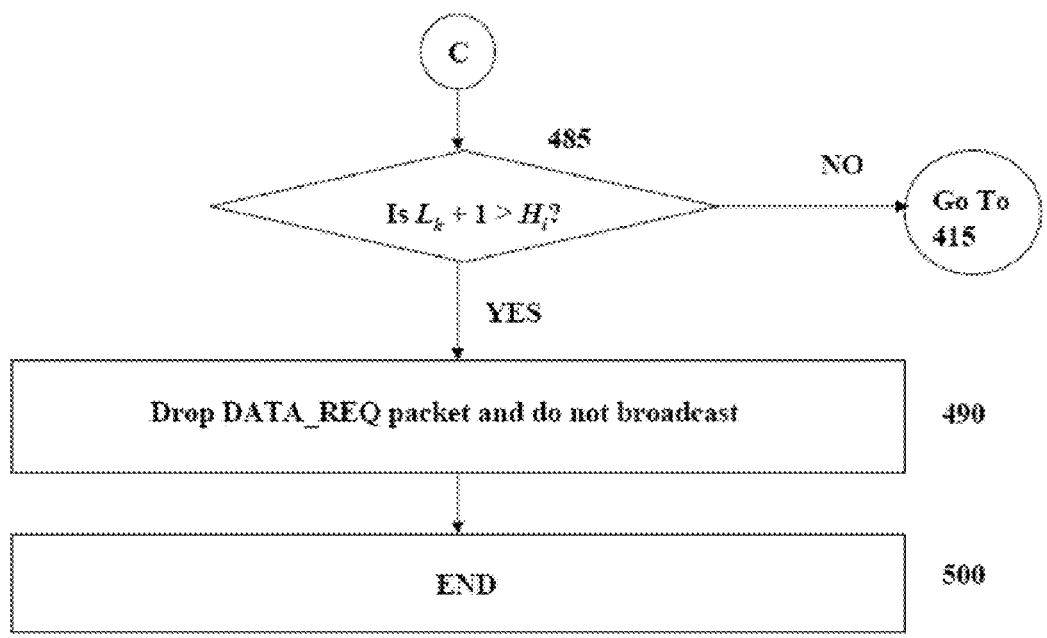

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

In some aspects, the MARP Routing Protocol is designed to cater to applications belonging to four different QoS classes. The first class of QoS involves normal applications, where these applications have no reliability requirement and latency constraint. The second class of QoS involves reliable applications, where these applications have a reliability requirement wherein the responses from the source nodes must reach the sink without any loss of the packets. However, there are no constraints imposed on delay in arrival of the packets. The third class of QoS involves low-latency applications, where these applications have a stringent upper bound on delay in packet arrival. However, there is no reliability requirement. Applications of this third class are time critical and the occurrence of any event is to be reported to the sink as fast as possible. The fourth class of QoS involves reliable and low-latency applications. These types of applications belong to the highest level of QoS class. They not only have restrictions on the maximum delay they can tolerate but also have reliability requirements. The packets from the sink to the sources and in the reverse path must traverse as fast as possible and also with a very low probability of getting lost.

An embodiment includes a routing protocol for wireless sensor networks. An embodiment integrates multiple QoS parameters within a single framework. An embodiment dynamically adapts to the Quality of Service requirement of a given packet. This enables the simultaneous handling of packets of various QOS requirements.

An example embodiment of a WSN includes a sink node, which floods the network with query messages when it is interested in collecting information of the environmental parameter that the network is monitoring. In an embodiment, the sink node is primarily responsible for collecting the information from the network and broadcasting a data request query (DATA_REQ) throughout the network by multi-hop. An example data request query packet (DATA_REQ) includes the following fields: the type of QoS required ranging from class 1 to class 4; the type of phenomenon detected by the sensors within the wireless sensor network (e.g., temperature, humidity, etc.); source address for which information is requested from the sink; forwarder address, which is the address of the node forwarding this request packet; hop-count, which indicates the number of hops the packet has propagated; and energy, which indicates the energy-level of the forwarding node. In an example operation, response to the query from the sink nodes, source nodes send back the response to the sink nodes. In an example embodiment, intermediate nodes on receiving this packet construct the routing table towards the sink, based on the information in the data request packet. The nodes satisfying the request criteria prepare the data reply packet (DATA_REP) and route it towards the sink based on the type of service requested.

In an embodiment, a query-based data gathering model or an event-driven model can be used. In-network processing is not explicitly assumed. However, the algorithm will work even when in-network processing and aggregation is done at some intermediate nodes while the responses from the source nodes are routed to the sink. In an embodiment, the sink node is powered by an external energy source and hence not particularly energy constrained. The source nodes can be battery driven and therefore may have power constraints and limited life-time. An embodiment includes nodes which are static and each node has a unique node identification number. The sensor nodes can transmit at least two pre-defined power levels, one for a short range communication and other for a long range communication, based on the latency constraint of the application.

FIG. 1 shows an example DATA_REQ packet format 100 sent by a sink throughout the network in accordance with an aspect of the present disclosure. Packet Type field 102 specifies whether a request or reply packet. ToS with Phenom field 110 specifies the kind of QoS support required by the application along with the type of environment to be sensed. Hop-Count ($L_k$) field 115, which is initially set to 0 at the sink, and is incremented by 1 as the packet hops through the network. Average Waiting Time field 125 specifies the time period for which a packet needs to wait in the queue for the particular node. Energy-Level field 130 specifies the energy level of the node. Source-Address field 135 specifies the address of the node generating the packet. Upstream Neighbor Address fields 145-155 are three upstream neighbor address fields inside the packet which indicates the three up-stream forwarder nodes for the node which transmits the DATA_REQ packet towards the sink. Fields numbered 120 and/or 160 may be reserved for future use or may be empty.

FIG. 2 shows an example DATA_REP packet format sent by the source nodes in accordance with an aspect of the present disclosure, shown generally at 200. Packet Type field 205 specifies whether packet is a request or reply Packet. ToS with Phenom field 210 specifies the kind of QoS support required by the application along with the type of environment to be sensed. Sequence Number field 215 indicates the sequence number of the packet being transmitted out of the replying node. Energy-Level field 225 specifies the energy level of the node. Source-Address field 230 specifies the address of the node generating the packet. Forwarder-Address field 235 specifies the address of the node participating in relaying the DATA_REP packet towards the sink. Next-hop Address field 240 specifies the next-hop node address to which the DATA_REP packet has to be forwarded towards the sink. Destination-Address field 245 specifies the destination node address where the DATA_REP packet has to finally reach.

Four classes of an example routing algorithms depending on type of QoS will now be discussed. In the first example class, which corresponds to normal applications, when the sensors are deployed and the designated sink node requires information from the source nodes, the sink node floods the network with a query packet: DATA_REQ. For normal applications, the ToS (Type of Service) bit 110 in the DATA_REQ packet header is set to 00, such that the nodes receiving DATA_REQ packet understands that the QoS type demanded belongs to a normal application. The DATA_REQ packets sent from the sink node finally reaches the source nodes. As the request packets reaches the sensor nodes in the network, each node starts updating a table maintained locally in each node. This table is called a Forwarding Information Table (FIT), shown generally at 300, which an example format is shown in FIG. 3. The FIT of a nodes contains the following information: (i) node ID of each of its neighbor nodes from which it has received DATA_REQ packet 305, (ii) the energy-level of each neighbor 310, (iii) for each neighbor of x, node IDs of three neighbors that have least-hop counts from the sink 325, 330 and 335. This information is updated based on the DATA_REQ packets that arrive at the nodes. At a time in which the network begins a bootstrapping process, all hop-count records are initially set to a high value typically greater than the diameter of the network. The FIT also has a field for average waiting time (T) 315 and a field for a hop-count to sink (H) 320.

FIGS. 4a, 4b, 4c and 4d show a flow chart for the example routing algorithm for the first class of QoS. By way of a non-limiting example, consider the hop-count field 115 in the DATA_REQ header from a neighbor node k to node i to be $L_k$, and the hop-count of node i from the sink to be $H_i$. When a DATA_REQ packet reaches from node k to node i at 405, for example, the entry in the FIT of node i is updated at 410 as follows. At 415, a determination is made as to whether the FIT of node i currently has any record for node k. If there is no record, then a new entry for node k is created at 335 and the $H_i$ field is updated based on the DATA_REQ packet at 440. The packet is further broadcast to all the neighbors of node i at 445. The process ends at 450. If it is determined that $L_k+1<H_i$ at 420, then the value of $H_i$ is replaced by the value of $L_k$ at 425. The packet is further broadcast to all the neighbors of node i at 430. If it is determined that $L_k+1=H_i$ at 455, then a new entry for node k is created in the FIT of node i at 460. The hop count field 115 is updated at 465 with the value $H_i$ for the DATA_REQ packet and the packet is broadcast at 470 to all the neighbors of node i. The process ends at 480. If it is determined that $L_k+1>H_i$ at 485, then the DATA_REQ packet is dropped at 490 and not broadcast further and the process ends at 500. This is because of the fact that node i, in this case, has received a DATA_REQ packet from node k which is further away from the sink than node i. If it is determined that $L_k+1$ is not greater than $H_i$ at 485, then to process goes back to 415. The process ends at 480. If this packet is further forwarded, it leads to the looping of packet in broadcast mode. When node i receives a DATA_REQ packet for which it is the intended source node (i.e., the query matches with the event being observed by node i), it sends a reply to it in the form of DATA_REP packet. For routing the DATA_REP packet to the sink, node i consults its local FIT and establishes the path. The routing algorithm discussed below is used for sending the packets from the source nodes to the sink node.

An example embodiment of a routing algorithm for sending the packets from the source nodes to the sink node for the first class of QoS is now given. Let $N_i$ be the set of neighbors of a node j where i=1, 2, 3 . . . n. Let $F_{im}$ be the set of forwarders for node i in the FIT where m=1, 2, 3. Let $E_i$ represent the energy-level of the node i. The algorithm begins at step 1, where nodes $N_x$, $N_y$, $N_z$ from $\{N_i\}$ in the FIT are selected such that their corresponding hop-counts $H_x$, $H_y$ & $H_z$ are the 3 least hop-counts. Step 2 of the algorithm continues by selecting node $N_k$ from $\{N_x, N_y, N_z\}$ such that $E_k$ is maximum, i.e. $E_{max}=E_k$. If $\{F_{km}\} \cap \{N_i\}=\Phi$, then forward the data packet to $N_k$. If not then, $\{N_i\}=\{N_i\}-N_k$, and step 1 is repeated.

Referring to FIG. 5, an embodiment of forwarding nodes in accordance with various aspects of the present disclosure are shown. Nodes $N_2$, $N_3$, and $N_4$ are the forwarder nodes of node $N_1$ for DATA_REQ packet. In other words, the DATA_REQ sent by the sink node reaches $N_1$ and is further forwarded to nodes $N_2$, $N_3$ and $N_4$. Let us assume that node $N_2$ is two-hops away from the sink whereas $N_3$ is one hop away from the sink. When node $N_1$ has to send the DATA_REP message to the sink, it chooses $N_2$, $N_3$ and $N_4$ as the three nodes for this purpose based on their hop-count values in the FIT. If node $N_2$ has higher energy than $N_3$ and $N_4$, then $N_1$ forwards the DATA_REP packet to $N_2$. When the DATA_REP packet reaches $N_2$, there is a chance that $N_2$ further forwards it to $N_3$ causing unnecessary delay and energy-consumption (since $N_1$ could have directly sent the packet to $N_3$). However, the hop-count information in the FIT maintained in $N_2$ will prevent this from happening.

In an example routing algorithm used for the first class of QoS, three forwarder nodes were considered based on the nodes being deployed densely on a field that has a straight line route towards the sink and at the least two alternate routes which can be constructed across this primary route. Hence this accounts for choosing three forwarder nodes towards the sink. The routing algorithm is based on local information in a neighborhood and does not require any global information about the network. Moreover, no route-cache maintenance is required as route discovery can be made dynamically. In addition, no complex computation is involved which results in energy-efficient operation of the protocol.

Operation of an example routing algorithm for the second class of QoS, where reliability of packet delivery is important but there is no stringent requirement on latency is now discussed. In an embodiment, the ToS (Type of Service) bit 110 in the DATA_REQ packet header is set to 01. Example reliability types include: (i) path reliability, and (ii) data reliability. Using a single path, it is possible to handle path reliability while achieving significant efficiency in power consumption. However, to incorporate data reliability, in this particular example embodiment, multi-path routing is followed. In an embodiment, three paths are constructed towards the sink, wherein the data reaching the sink along these paths are compared with each other to ensure maximum data reliability. Each node employs link-layer acknowledgment mechanism to identify any failed nodes in its neighborhood. If an acknowledgment does not reach within a pre-defined time frame, the neighbor node is assumed to have failed.

Figure 6:
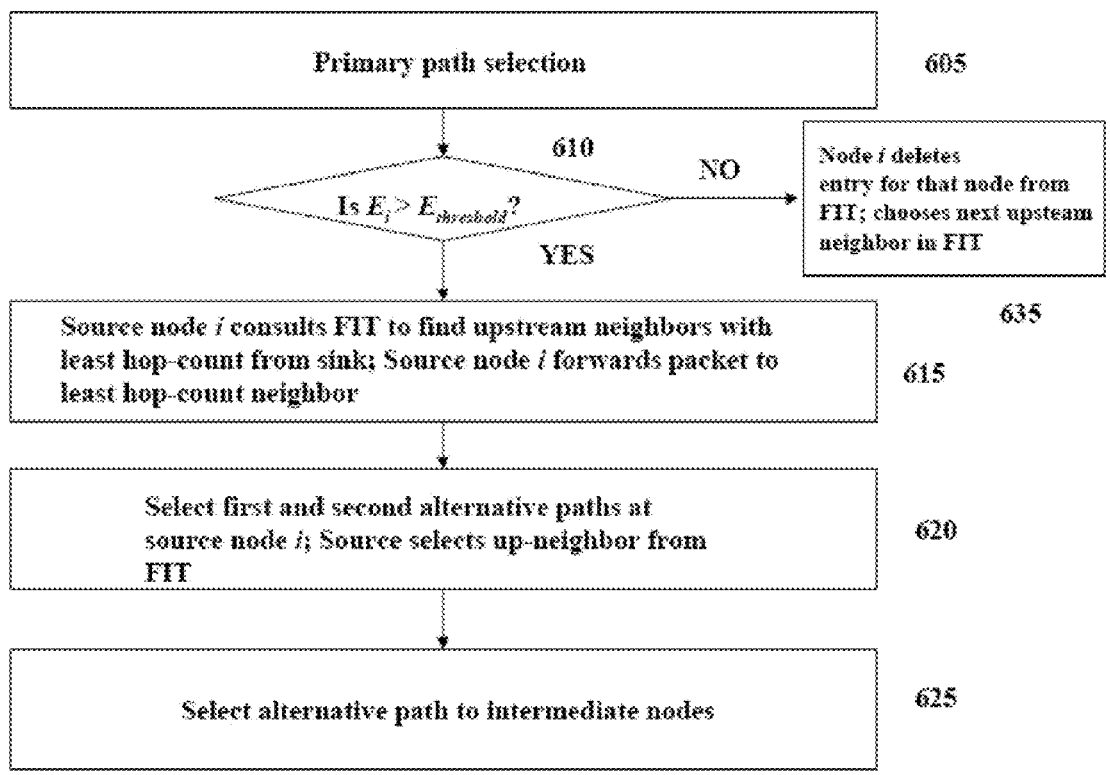
FIG. 6 shows an example flowchart for the example routing algorithm for the second class of QoS.

FIG. 6 shows a flowchart for the example routing algorithm for the second class of QoS. In an embodiment of the second class of QoS routing algorithm, there are three steps, which include (i) primary path selection, (ii) selection of first and second alternate path at the source node, and (iii) alternate path selection at the intermediate nodes. In the first step at 605 (primary path selection), a determination is made as to whether the following condition is satisfied: $E_i > E_{threshold}$, where $E_{threshold}$ is the minimum energy-level required for a node to receive and forward the data packet at 610. If the condition is satisfied, the source node i consults its FIT to find its upstream neighbors (the path from source to sink is upstream path; the reverse path is downstream) with least hop-count from the sink and forwards the packet to that neighbor (which is nearer to the sink) at 615. If the energy-level of a neighbor node falls below this threshold, node i deletes the corresponding entry for that node from its FIT, and chooses the next up-stream neighbor in its FIT at 635. In case a node is found to have failed, the immediate downstream node is responsible for finding the new path to the sink. The node in the immediate neighborhood of the failed node in this case selects the node with the least hop-count from the source from the FIT after deleting the record of the failed node from its FIT. In the second step at 620 (first and second alternate path selection at the source), the source selects the up-neighbor from the FIT as follows: select $N_{1a}$, $N_{2a}$ from $\{Ni\}-N_p$, where $N_p$ is the up-neighbor of the source in the primary path and $N_{1a}$ and $N_{2a}$ are the up-neighbors for the source in the first and second alternate path respectively having the next least hop-counts after the primary path. In the third step at 625 (alternate path selection at the intermediate nodes), since wireless communication is inherently broadcast in nature, the header information of a packet forwarded by a node is accessible to all the nodes in its neighborhood, although the data payload of the packet may be protected by some cryptographic techniques.

Referring again to the second class of QoS algorithm, by looking at the header, it is possible to understand for an intermediate node that it lies in the path from a particular source node to the sink node. Based on this information collected over a period of time, the intermediate nodes construct Path Construction Tables (PCT), for which an example format is shown generally at 700 in FIG. 7. The ACT has the following fields: Node_ID ($C_i$) 705, Source-Address ($C_{isa}$) 710 and Destination-Address ($C_{ida}$) 715. These PCTs can help in construction of alternate paths if required. In an embodiment, when an intermediate node receives a packet for further forwarding, the node consults its FIT to select a node and compares it with the PCT to ensure that the selected node is not in the path for that particular source node.

After the primary path, first and second alternate paths are created both at the source and the intermediate nodes. The following pseudocode routing algorithm may be used to send packets from the source nodes to the sink node. In the routing algorithm and throughout this disclosure, the "==" operator represents a test for equality. For example, x==y means if and only if x is equal to y, execute the statement following. Moreover, the "&&" operator represents a logical conjunction which is a two-place logical connective that has the value (rue if both of its operands are true, otherwise a value of false. The routing algorithm begins by letting Ni be the set of neighbors of a node j, where i=1, 2, 3 . . . n. Let $C_i$ be the set of node entries in the Path Construction Table which are in the path for a particular source-destination pair where i=1, 2, 3 . . . n. Let $P_{sa}$ and $P_{da}$ be the source and destination address in the DATA_REP packet. In step 1, select $N_x$ from $\{N_i\}$ in the FIT such that its corresponding hop-count $H_x$ is the least hop-count. In Step 2, if ($\{C_i\} \cap N_x == \Phi$). Choose $N_x$ as the next forwarding node. Make the corresponding entry in the PCT; else if ($C_{isa}==P_{sa}$ && $C_{ida}==P_{da}$) $\{N_i\}=\{N_i\}-N_x$. Step 1 is repeated, else choose $N_x$ as the next forwarding node and make the corresponding entry in the PCT. The above routing algorithm does not require complex computation as simple comparison of the tables at the intermediate nodes is required to find the next-hop node for forwarding. This requires less energy since use of beacon signals is not required to find the next-hop nodes.

An example operation of the routing algorithm for the third class of QoS, where low-latency applications which have a stringent latency bound is discussed. For such cases, the ToS (Type of Service) bit in the DATA_REQ packet header 110 is set to 10. However, the reliability of packet delivery is not an important issue. To minimize the delay in packet forwarding, the nodes are operated with an increased transmission power to increase the range so that the number of hops is reduced.

Figure 8:
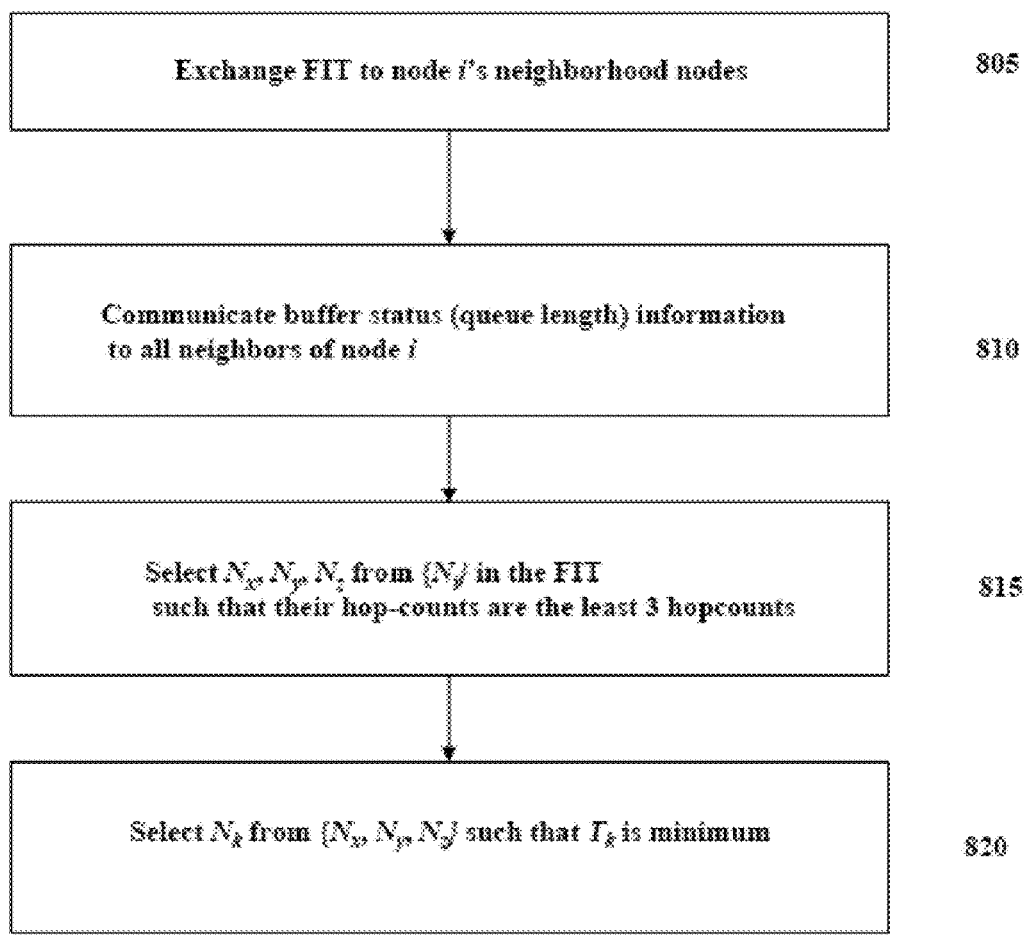
FIG. 8 shows an example flowchart for the example routing algorithm for the third class of QoS.

FIG. 8 shows an example flowchart for the example routing algorithm for the third class of QoS. The routing algorithm for the third class of QoS begins by letting $N_j$ be the set of neighbors of a node j where i=1, 2, 3 . . . n. Let $T_i$, represent the average waiting time for a packet in the queue for the node i. At 805, FIT information are exchanged in node i's neighborhood. At 810, the information about the buffer status (queue length) is communicated to all the neighbors of node i. An additional field in the FIT table may be created for this purpose. Since all the sensor nodes in the WSN are similar in this example embodiment, the queue length in the buffer of a node will give an idea about the expected waiting time in a node. At 815 $N_x$, $N_y$, $N_z$ are selected from $\{N_i\}$ in the FIT such that their corresponding hop-counts $H_x$, $H_y$ & $H_z$ are the 3 least hopcounts. At 820, $N_k$ is selected from $\{N_x, N_y, N_z\}$ such that $T_k$ is minimum. Since most of the delay a packet experiences is caused due to waiting in the buffers of the intermediate nodes, the delay is minimized by choosing those forwarder nodes that have least waiting time (or smaller queues of packets in buffer).

Referring now to an example operation of the routing algorithm for the fourth class of QoS, where reliable and low-latency applications which are not only time critical but also require high reliability of packet delivery. For such applications, the ToS (Type of Service) bit in the DATA_REQ packet header 110 can be set to 11. Finding an optimal path with multiple constraints may be an NP-complete problem if it involves more than one additive metrics. For example, finding a delay-constrained least-cost path is an NP-complete problem. Most QoS approaches focus on one of the parameters, for example packet loss, end-to-end delay, bandwidth etc. Because reliability and end-to-end delay are inversely related, it may not be possible to find the path that simultaneously satisfies the delay and reliability. The design of this protocol considers two path constructions towards the sink. As mentioned earlier, since reliability and end-to-end delay are inversely proportional, increasing the number of paths to ensure reliability increases the delay of routing the packets towards the sink. Decreasing the paths to lessen the latency leads to poor reliability. Therefore, these QoS are optimized by considering two paths towards the sink.

Figure 9:
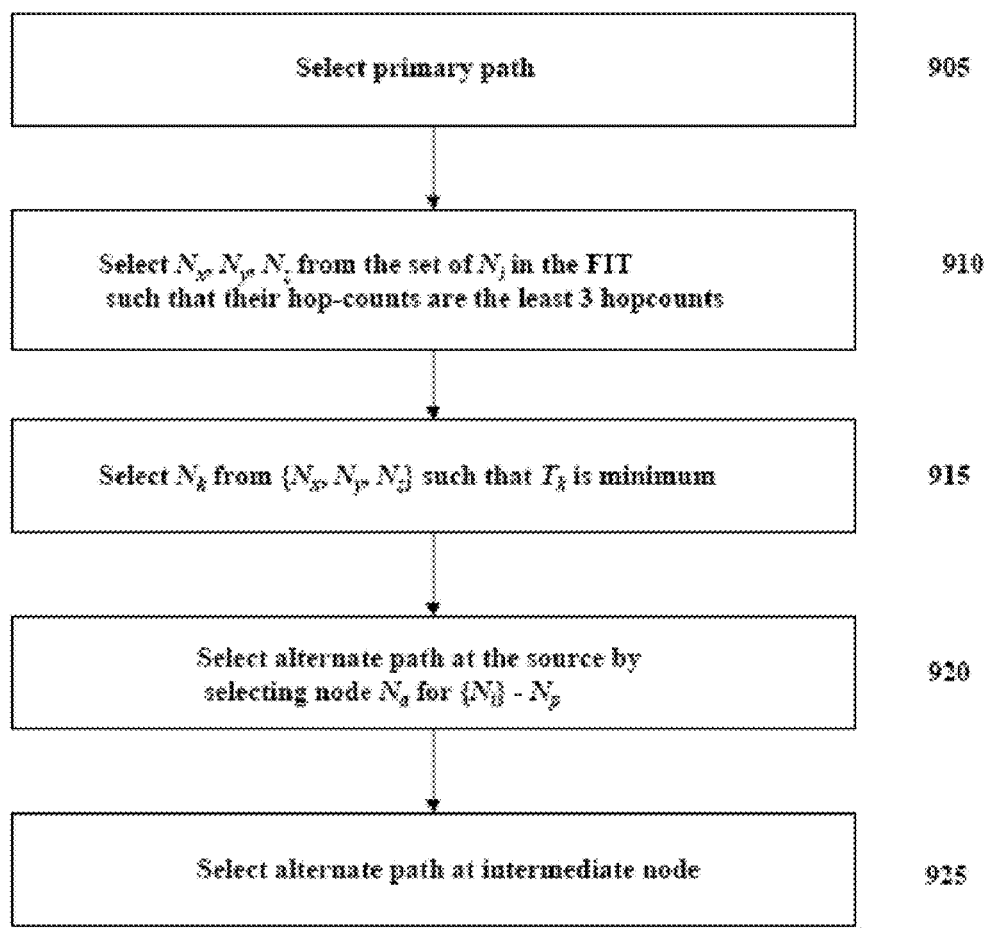
FIG. 9 shows an example flowchart for the example routing algorithm for the fourth class of QoS.

FIG. 9 shows an example flowchart for the example routing algorithm for the fourth class of QoS. First, the primary path is selected at 905. Let $N_j$ be the set of neighbors of a node j where i=1, 2, 3 . . . n. Let $T_i$ represent the average waiting time for a packet in the queue for the node i. At 910, $N_x$, $N_y$, $N_z$ are selected from $\{N_i\}$ in the FIT such that their corresponding hop-counts $H_x$, $H_y$, & $H_z$ are the 3 least hopcounts. At 915, $N_k$ is selected from $\{N_x, N_y, N_z\}$ such that $T_k$ is minimum. Now, an alternate path at the source is selected at 920. The source selects the up-neighbor from the FIT as follows: select node $N_a$ from $\{N_i\}-N_p$ where $N_p$ is the up-neighbor of the source in the primary path and $N_a$, the up-neighbor for the source in the alternate path having the next least average waiting time after the primary path. An alternate path at intermediate nodes is then selected at 925. The method of selection of forwarding nodes for generation of alternate path at the intermediate nodes is the same as that in second class, which was described earlier. However, in this fourth class of QoS case, the node selection criteria is based on the average waiting time of the packets in the buffers of the intermediate nodes and not the hop-count as it was in the second class.

EXAMPLES

Example protocols were tested and implemented on a network simulator NS-2 version 2.3.2. This version of the simulator has some enhanced functionalities ideally suited for simulating wireless sensor networks. The simulator supports wireless link quality detection, energy detection, clear channel assessment, multi-channel support, simulation tracing and enhanced network animation libraries. The example routing algorithms were implemented on 802.15.4 MAC protocol which is already implemented in the NS-2 simulator.

To study and analyze the performance of protocols, two metrics were chosen: (i) average dissipated energy in sensor nodes, (ii) average latency in message communication. Average dissipated energy is defined as the ratio of total energy dissipated per node in the network to the number of packets received by the sink over a given period of time. Essentially, this metric, on the average, measures the work done by a sensor node for a data query request sent from the sink. A lower value of average energy dissipation per node will ensure a longer lifetime of the sensor network. The second metric, average delay, measures the average one-way time delay (latency) in message communication from a source node to the sink node. The performance of protocols were studied with respect to the above two metrics with varying network sizes.

The example simulations were carried out with ten different network topologies and the final results are presented based on the average of these different result sets. The number of nodes in the network was increased from 50 to 150, with 25 nodes being added in every step of increment. The node density in the network was kept constant throughout the simulation. Initially, 50 sensors nodes were randomly distributed on a 70 m*70 m area.

The area of deployment of the nodes was increased as more sensor nodes were added in the network so that the node density was maintained constant. The radio range for each sensor nodes was chosen to be 15 m for simulation of the first two classes of the routing protocol. The power level of the nodes was chosen to be less for these two classes as there are no latency constraints. However, for the last two classes, to satisfy the delay constraints, the sensor nodes were assumed to have a large radio range of 30 m. According to ZMD4410X specifications, the power requirement for a sensor node to transmit a packet is 31 mA*2.4V=0.0744 W when the radio range of the sensor is 15 m. For a radio range of 30 m, a sensor node consumes 45 mA*2.4V=0.108 W when it transmits a packet. However, when a sensor node receives a packet, it consumes an energy of 27 mA*2.4V=0.0648 W. The idle mode power consumption for a node is 27 µA*2.4V=5.52 µW.

In every simulation, one node was chosen as the sink node and three nodes were randomly chosen as the source nodes. The sink node generates the query, and the source nodes send their responses to the sink. The replies are sent interspersed by an interval of 1 ms. Each reply packet is assumed to be of 80 bytes length. In every simulation, it is observed that these multiple replies from the source nodes do not lead to any congestion in the network. However, in certain scenarios, some nodes may experience congestion leading to packet drops if they have to handle too many packet transmission and reception simultaneously.

FIG. 10 shows the average energy dissipated per node for different network sizes. All the four classes of the protocol are compared for this purpose. It can be observed that class 1 is most energy-efficient. Class 2 consumes more power than class 1 as it identifies multiple paths for routing and uses them. In class 3, power dissipation is more compared to class 2 as it requires higher transmission range to reduce transmission delay and also due to more power consumption for packet reception in the return path. Class 4 leads to maximum dissipation of power as it ensures highest level of QoS both in terms of reliability and latency.

FIG. 11 shows the average delay for different classes of the protocol. As mentioned earlier, this delay is experienced by a packet as it traverses from a source node to the sink node. Class 3 results in the minimum latency as it is designed for situations which have latency constraints but no reliability requirements. The average latency for this class is around 17 ms. Class 2 has the highest latency since it is designed for more reliability without any specific constraint imposed on the latency. To guarantee more reliability, it constructs multiple paths and forwards packets though those paths. This results in more delay. Although class 4 uses more power for packet transmission to reduce delay, it has more latency than class 3 due to construction of alternate path at the source. Class 1 causes more delay than class 4 as it uses less transmission power. However, since construction of multiple paths is not required, it has less latency compared to class 2.

To study the performance of the protocol from a reliability perspective, the protocol is simulated in scenarios where sensor nodes fail after the DATA_REQ packet from the sink node is broadcasted throughout the network. Number of reply packets reaching the sink node in this case gives an idea about the reliability of the protocol. The higher the number of reply packets that reach the sink node, the higher will be the reliability of the protocol. Class 2 of the protocol always guarantees above 99% delivery of the DATA_REP packet to the sink. This is due to the fact that in class 2, any failed node is always detected beforehand and a packet is forwarded to a node in an alternate path. However, in class 1, class 3 and class 4, to reduce delay, the mechanism of reconstruction of alternate paths is not used. Therefore, in all these classes, failed sensor nodes may cause some packets being lost in the network. To understand the effect of failed nodes on the probability of successful packet delivery to the sink node, simulations were executed on a sensor network with 5, 75, 100 and 125 sensor nodes.

Under every such scenario, two cases are considered: (i) 10% of the nodes failed, (ii) 20% of the nodes failed. Experiments were repeated 10 times and the average data is presented in FIG. 12 and FIG. 13. From FIG. 12 and FIG. 13, it can be easily observed that class 4 ensures a sufficiently high probability of packet delivery. This is because of the fact that class 4 always routes packets through an alternate path in addition to the primary routing path. It may be observed from FIG. 12 and FIG. 13 that class 3 provides more reliability in terms of packet delivery to the sink in comparison to class 1. In contrast to class 1, class 3 requires less number of nodes for forwarding a packet from a source node to the sink. Thus with the same percentage of failed nodes in a network, the probability that class 1 will encounter a failed node in its routing path will be higher than that in class 3. This explains the reason for low probability of successful packet delivery in class 1. The overall results obtained in simulations demonstrate the effectiveness of the different cases of the scheme for different scenarios.

Figure 14:
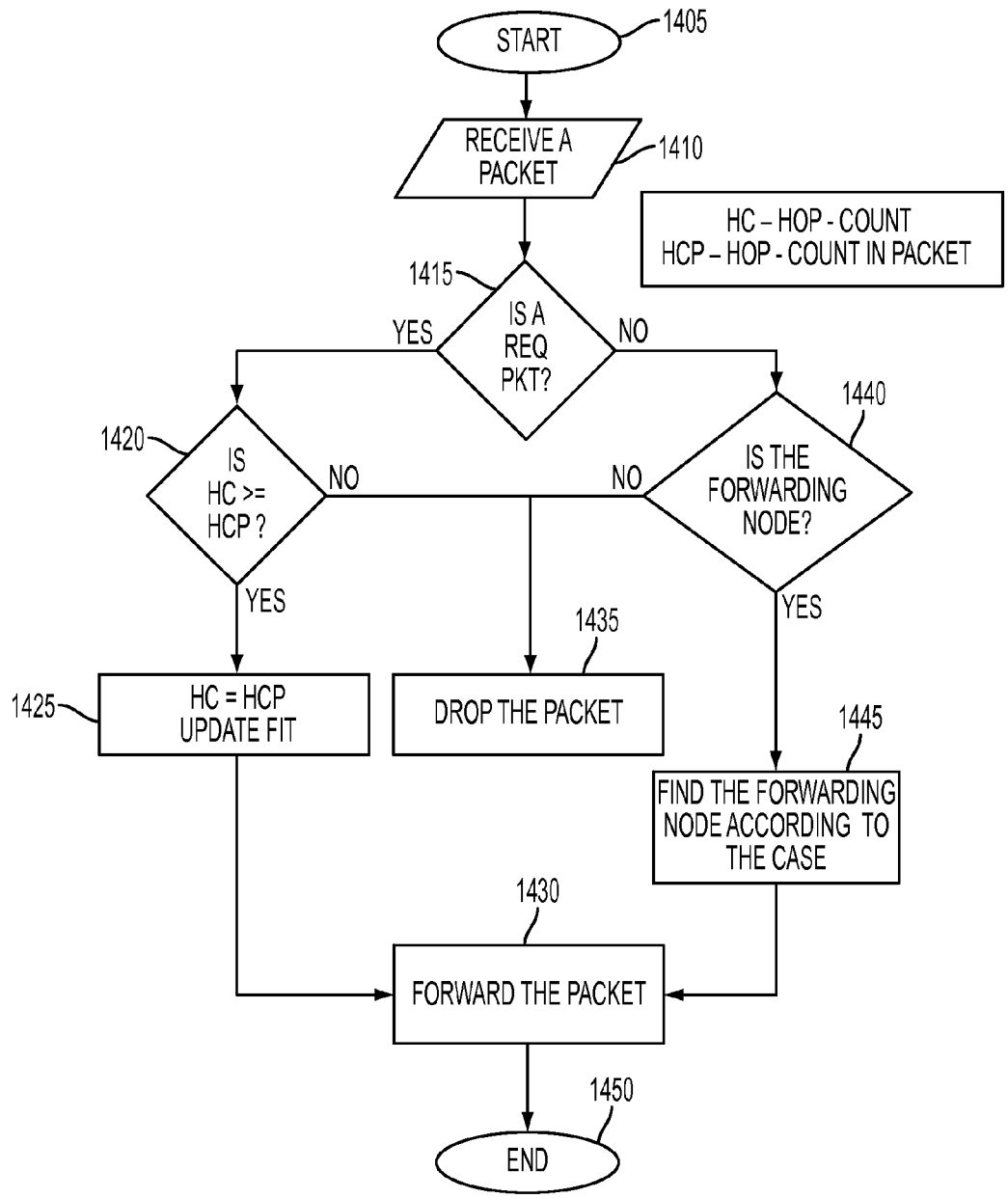
FIG. 14 illustrates the flow of packets through a node for a query-based implementation.

In some embodiments of the present disclosure, the algorithm is implemented as a query-driven protocol. FIG. 14 illustrates the flow for this implementation. The protocol begins at 1405 and continues to 1410 where a packet is received. At 1415, the received packet is checked to determine whether it is a DATA_REQ packet. If the packet is a DATA_REQ packet, then at 1420 a determination is made if the Hop-Count (HC)>=the Hop-Count in the packet (HCP). If HC is greater than or equal to HCP of the DATA_REQ packet, then value of HC is assigned or set to the value of HCP and the FIT is updated at 1425 and the packet is forwarded at 1430. If the packet is not a DATA_REQ packet as determined at 1415, then the packet is checked as to whether it is a forwarding node at 1440, and if the result is affirmative, then the forwarding node according to the class is found at 1445. The packet is then forwarded at 1430. If the determination is negative that HC>=HCP at 1420 or the that the node is not a forwarding node at 1440, then the packet is dropped at 1435. Once the packet is forwarded at 1430, the process ends at 1450.

Figure 15:
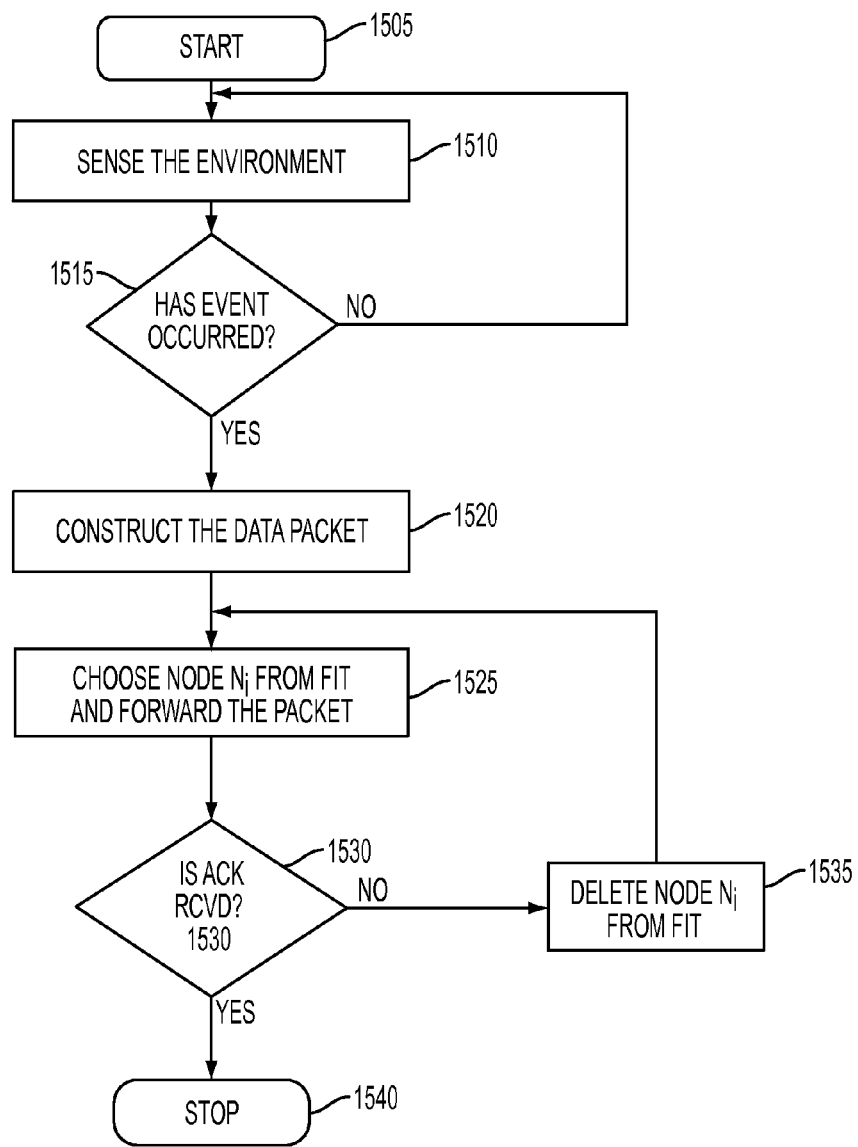
FIG. 15 illustrates the flowchart for an event-driven implementation.

In some embodiments of the present disclosure, the query-based algorithm can be implemented as an event-driven protocol so that instead of the sink node sending query messages to a set of source nodes, the occurrence of any event can be reported by the sensor nodes to the sink node directly in a proactive manner. FIG. 15 illustrates the flowchart for an event-driven implementation. The process begins at 1505 and continues to 1510 where the environment is monitored. A determination is made at 1515 as to whether an event as occurred. If no events are determined to have occurred, then the process loops back to after 1505. If events have been determined to have occurred, then a data packet is constructed at 1520. Node $N_i$ is then chosen from FIT and the packet is forwarded at 1525. A determination as to whether an acknowledgement (ACK) is received occurs at 1530. If no acknowledgement (ACK) is received, the node $N_i$ is deleted from FIT at 1535 and the process loops back to after 1520. If an acknowledgement is received, the process concludes at 1540.

FIG. 16 shows an example portion of pseudocode. The pseudocode begins at step 1 and at step 2 a packet is received. At step 3, if Packet==REQ, then at step 4 if (Node Hop-count>=Hop-count in the Packet), then Node Hop-count=Hop-count in the Packet, the Forwarding Information Table is updated and the packet is forward. If Node Hop-count is not greater than or equal to Hop-count in the Packet, then the packet is dropped. At step 5, Else (Node=Forwarder) then Find the round according to the CASE and forward the packet. The pseudocode ends at step 6.

Figure 17:
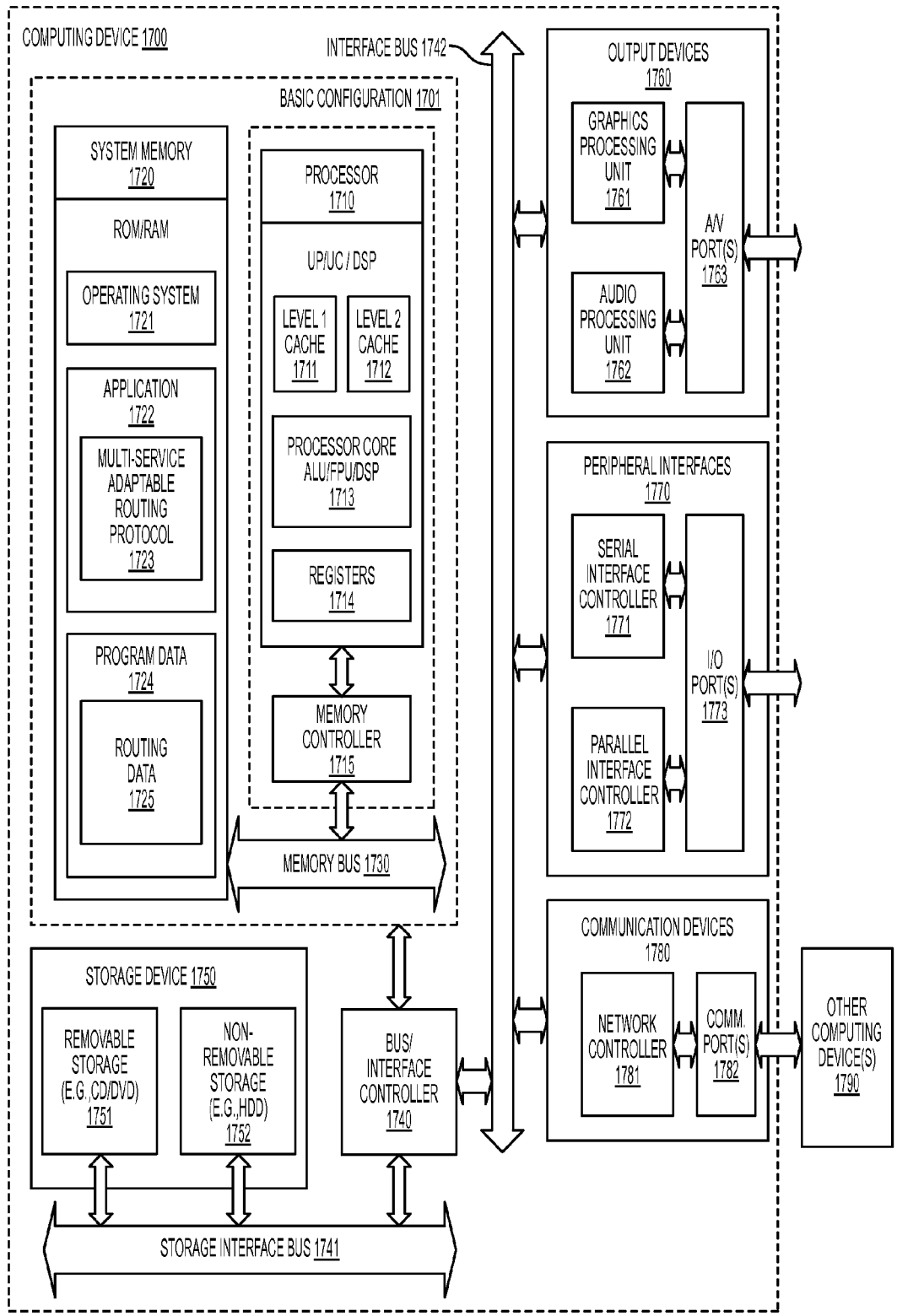
FIG. 17 is a block diagram illustrating an example computing device 1700 that is arranged for multi-service adaptable routing protocol for wireless sensor networks in accordance with the present disclosure.

FIG. 17 is a block diagram illustrating an example computing device 1700 that is arranged for multi-service adaptable routing protocol for wireless sensor networks in accordance with the present disclosure. In a very basic configuration 1701, computing device 1700 typically includes one or more processors 1710 and a system memory 1720. A memory bus 1730 may be used for communicating between processor 1710 and system memory 1720.

Depending on the desired configuration, processor 1710 may be of any type including but not limited to a microprocessor (µP), a microcontroller (µC), a digital signal processor (DSP), or any combination thereof. Processor 1710 may include one more levels of caching, such as a level one cache 1711 and a level two cache 1712, a processor core 1713, and registers 1714. An example processor core 1713 may include an arithmetic logic unit (ALU), a floating point unit (FPU), a digital signal processing core (DSP Core), or any combination thereof. An example memory controller 1715 may also be used with processor 1710, or in some implementations memory controller 1715 may be an internal part of processor 1710.

Depending on the desired configuration, system memory 1720 may be of any type including but not limited to volatile memory (such as RAM), non-volatile memory (such as ROM, flash memory, etc.) or any combination thereof. System memory 1720 may include an operating system 1721, one or more applications 1722, and program data 1724. Application 1722 may include a multi-service adaptable routing algorithm 1723 that is arranged to perform the functions as described with respect to processes of FIGS. 4a, 4b, 4c, 4d, 6, 8 and 9. Program data 1724 may include routing data 1725 that may be useful for configuring routing algorithm as is described herein. In some embodiments, application 1722 may be arranged to operate with program data 1724 on operating system 1721 such that implementations of multi-service routing may be provided as described herein. This described basic configuration 1701 is illustrated in FIG. 17 by those components within the inner dashed line.

Computing device 1700 may have additional features or functionality, and additional interfaces to facilitate communications between basic configuration 1701 and any required devices and interfaces. For example, a bus/interface controller 1742 may be used to facilitate communications between basic configuration 1701 and one or more data storage devices 1750 via a storage interface bus 1741. Data storage devices 1750 may be removable storage devices 1751, non-removable storage devices 1752, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 1720, removable storage devices 1751 and non-removable storage devices 1752 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 1700. Any such computer storage media may be part of computing device 1700.

Computing device 1700 may also include an interface bus 1742 for facilitating communication from various interface devices (e.g., output devices 1760, peripheral interfaces 1770, and communication devices 1780) to basic configuration 1701 via bus/interface controller 1742. Example output devices 1760 include a graphics processing unit 1761 and an audio processing unit 1762, which may be configured to communicate to various external devices such as a display or speakers via one or more A/V ports 1763. Example peripheral interfaces 1770 include a serial interface controller 1771 or a parallel interface controller 1772, which may be configured to communicate with external devices such as input devices (e.g., keyboard, mouse, pen, voice input device, touch input device, etc.) or other peripheral devices (e.g., printer, scanner, etc.) via one or more I/O ports 1773. An example communication device 1780 includes a network controller 1781, which may be arranged to facilitate communications with one or more other computing devices 1790 over a network communication link via one or more communication ports 1782.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 1700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1700 may also be implemented as a personal computer including both laptop computer and non-laptop computer configurations.

Some non-limiting industrial examples where the example algorithms can be used are outlined below. The first example industrial example is an environmental application, and in particular, precision agriculture. Applying WSN to agriculture allows precise irrigation and fertilizing by placing humidity/soil composition sensors into the fields. A relatively small number may be sufficient, such as about one sensor per 100 m×100 m area. Precision farming requires analysis of spatial data to determine crop response to varying properties such as soil type. The ability to embed sensor nodes in a field at strategic locations could give farmers detailed soil analysis to help maximize crop yield or possibly alert them when soil and crop conditions attain a predefined threshold. Since wireless sensor networks are designed to run unattended, active physical monitoring is not required.

Another example environmental application is forest-fire detection. Sensor nodes are equipped with thermometers and can determine their own location (relative to each other or in absolute coordinates). A wireless sensor network deployed in the forest could immediately notify authorities before it begins to spread uncontrollably. These sensors are deployed over a wildfire, for example, a forest, from an airplane. They collectively produce a "temperature map" of the area or determine the perimeter of areas with high temperature that can be accessed from the outside. Similar scenarios are possible for the control of accidents in chemical factories.

Another example industrial example is a healthcare application, such as tracking and monitoring patients inside hospital. The use of WSN in health care applications is a potentially a very beneficial, even if ethically controversial, application. Possibilities range from post-operative and intensive care, where sensors are directly attached to patients—the advantage of doing away with cables is considerable here—to the long-term surveillance of (typically elderly) patients and to automatic drug administration (embedding sensors into drug packaging, raising alarms when applied to the wrong patient, is conceivable). Also, patient and doctor tracking systems within hospitals can be literally life saving. Patients could move about more freely while still being under constant supervision.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is being claimed:

1. An apparatus comprising:
   a sensor node configured to operate in a wireless sensor network, wherein the sensor node is configured to receive a data packet that comprises a quality of service field, to examine the quality of service field, and to invoke one of a plurality of pre-stored algorithms depending on the value of the quality of service field, each of the pre-stored algorithms causing the sensor node to select at least one second sensor node from a plurality of second sensor nodes to which to broadcast the data packet, wherein the at least one second sensor node selected based on one of the pre-stored algorithms is different than the at least one second sensor node selected based on another of the pre-stored algorithms.

2. The apparatus according to claim 1, wherein the quality of service field is application dependent.

3. The apparatus according to claim 2, wherein the quality of service field indicates that the application dependency relates to energy efficiencies, reliability, latency, or one or more thereof.

4. The apparatus according to claim 1, wherein one of the plurality of pre-stored algorithms is for energy-efficient packet routing within the wireless sensor network.

5. The apparatus according to claim 1, wherein one of the plurality of pre-stored algorithms is for high-reliability packet routing within the wireless sensor network.

6. The apparatus according to claim 1, wherein one of the plurality of pre-stored algorithms is for low latency packet routing within the wireless sensor network.

7. The apparatus according to claim 1, wherein one of the plurality of pre-stored algorithms is for high-reliability and low latency packet routing within the wireless sensor network.

8. A system comprising:
   a plurality of sensor nodes arranged in a wireless sensor network, each sensor node configured to receive and broadcast data packets, wherein each of the plurality of sensor nodes broadcasts the data packets using one of a plurality of modes invoked based on a quality of service indicator within the data packet, wherein, based on the mode, each of the plurality of sensor nodes selects at least one sensor node from a subset of the plurality of sensor nodes to which to broadcast the data packet, the selected at least one sensor node being different in different modes.

9. The system according to claim 8, wherein the quality of service indicator is application dependent.

10. The system according to claim 9, wherein the quality of service indicator indicates that the application dependency relates to energy efficiencies, reliability, latency, or one or more thereof.

11. The system according to claim 8, wherein one of the plurality of modes includes an energy-efficient packet routing mode for routing data packets within the wireless sensor network.

12. The system according to claim 8, wherein one of the plurality of modes includes a high-reliability packet routing mode for routing data packets within the wireless sensor network.

13. The system according to claim 8, wherein one of the plurality of modes includes a low latency packet routing mode for routing data packets within the wireless sensor network.

14. The system according to claim 8, wherein one of the plurality of modes includes a high-reliability and a low latency packet routing mode for routing packets within the wireless sensor network.

15. A method comprising:
   transmitting a query packet to at least one of a plurality of sensor nodes within a wireless sensor network by a sink node, wherein the query packet is not constrained by a reliability requirement or latency requirement, and wherein the query packet includes a Type of Service Bit that is set to a value denoting a normal application;
   updating a table stored in the sensor node with information of an adjacent sensor node within the wireless sensor network from which the sensor node has received the query packet; and
   using the table in conjunction with a selected one of a plurality of routing algorithms to route a data packet to at least one other sensor node selected from a subset of the plurality of sensor nodes.

16. The method according to claim 15, wherein the information includes node identity information, an energy-level of each adjacent sensor node, and a node identification of three adjacent nodes that have least-hop counts from the sink node.

17. The method according to claim 15, wherein the data packet includes a quality of service field that is application dependent.

18. The method according to claim 17, wherein the quality of service field indicates that the application dependency relates to one or more of energy efficiencies, reliability or latency.

19. The method according to claim 17, wherein the one or more sensor nodes is configured to select the selected one of the plurality of routing algorithms depending on the value of the quality of service field.

20. The method according to claim 15, wherein the table is updated with information selected from the group consisting of: a node ID of a neighbor node from which a query packet was received, an energy level of the neighbor node, and a node ID of the neighbor node that has least-hop counts from the sink node.

* * * * *

UNITED STATES PATENT AND TRADEMARK OFFICE
CERTIFICATE OF CORRECTION

PATENT NO.         : 8,295,280 B2
APPLICATION NO.    : 12/726945
DATED              : October 23, 2012
INVENTOR(S)        : Gopalakrishna et al.

It is certified that error appears in the above-identified patent and that said Letters Patent is hereby corrected as shown below:

On the Title Page, in Item (56), under "OTHER PUBLICATIONS", in Column 2, Line 3, delete "102 114," and insert -- 102-114, --, therefor.

On Title Page 2, in Item (56), under "OTHER PUBLICATIONS", in Column 1, Line 12, delete "22-3 1," and insert -- 22-31, --, therefor.

On Title Page 2, in Item (56), under "OTHER PUBLICATIONS", in Column 1, Line 13, delete "Handbook" and insert -- "Handbook --, therefor.

On Title Page 2, in Item (56), under "OTHER PUBLICATIONS", in Column 1, Line 14, delete "Architectures," and insert -- Architectures," --, therefor.

On Title Page 2, in Item (56), under "OTHER PUBLICATIONS", in Column 1, Line 18, delete "Sensor Network Protocols," and insert -- "Sensor Network Protocols," --, therefor.

On Title Page 2, in Item (56), under "OTHER PUBLICATIONS", in Column 1, Line 20, delete "Wireless" and insert -- "Wireless --, therefor.

On Title Page 2, in Item (56), under "OTHER PUBLICATIONS", in Column 1, Line 21, delete "Applications," and insert -- Applications," --, therefor.

On Title Page 2, in Item (56), under "OTHER PUBLICATIONS", in Column 1, Line 23, delete "Wireless" and insert -- "Wireless --, therefor.

On Title Page 2, in Item (56), under "OTHER PUBLICATIONS", in Column 1, Line 24, delete "Protocols," and insert -- Protocols," --, therefor.

On Title Page 2, in Item (56), under "OTHER PUBLICATIONS", in Column 1, Line 25, delete "Implementation" and insert -- "Implementation --, therefor.

Signed and Sealed this
Twenty-sixth Day of November, 2013

Margaret A. Focarino
*Commissioner for Patents of the United States Patent and Trademark Office*

CERTIFICATE OF CORRECTION (continued)
U.S. Pat. No. 8,295,280 B2

On Title Page 2, in Item (56), under "OTHER PUBLICATIONS", in Column 1, Line 26, delete "Networks," and insert -- Networks," -- therefor.

On Title Page 2, in Item (56), under "OTHER PUBLICATIONS", in Column 1, Line 29, delete "qos" and insert -- QoS --, therefor.

On Title Page 2, in Item (56), under "OTHER PUBLICATIONS", in Column 2, Line 1, delete "Manivannan. Routing" and insert -- Manivannan, "Routing --, therefor.

On Title Page 2, in Item (56), under "OTHER PUBLICATIONS", in Column 2, Lines 1-2, delete "Networks. In" and insert -- Networks," in --, therefor.

On Title Page 2, in Item (56), under "OTHER PUBLICATIONS", in Column 2, Line 24, delete "(Ipdps," and insert -- (IPDPS, --, therefor.

On Title Page 2, in Item (56), under "OTHER PUBLICATIONS", in Column 2, Line 29, delete "Confernce" and insert -- Conference --, therefor.

In the Specification

In Column 5, Line 28, delete "a nodes" and insert -- a node x --, therefor.

In Column 7, Line 43, delete "ACT" and insert -- PCT --, therefor.

In Column 7, Line 59, delete "(rue" and insert -- true --, therefor.

In Column 7, Line 61, delete "Ni" and insert -- $N_i$ --, therefor.

In Column 8, Line 3, delete "$C_{ida}=P_{da}$" and insert -- $C_{ida}=P_{da}$) --, therefor.

In Column 10, Line 54, delete "5," and insert -- 50, --, therefor.